US009167493B2

(12) United States Patent
Anschutz

(10) Patent No.: US 9,167,493 B2
(45) Date of Patent: Oct. 20, 2015

(54) METHOD AND APPARATUS FOR PROVIDING A CLOUD-BASED MOBILITY IN A WIRELESS NETWORK

(75) Inventor: Thomas A. Anschutz, Conyers, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 314 days.

(21) Appl. No.: 13/525,237

(22) Filed: Jun. 15, 2012

(65) Prior Publication Data

US 2013/0336286 A1 Dec. 19, 2013

(51) Int. Cl.
*H04L 12/56* (2006.01)
*H04W 4/00* (2009.01)
*H04W 36/08* (2009.01)

(52) U.S. Cl.
CPC ..................................... *H04W 36/08* (2013.01)

(58) Field of Classification Search
USPC ........................................................ 370/331
See application file for complete search history.

(56) References Cited

U.S. PATENT DOCUMENTS

| 8,554,950 | B2* | 10/2013 | Omar et al. ................... 709/246 |
| 2010/0005465 | A1* | 1/2010 | Kawato ............................. 718/1 |
| 2010/0329208 | A1* | 12/2010 | Hayashi et al. ............... 370/331 |
| 2011/0002292 | A1* | 1/2011 | Wang et al. ................... 370/329 |
| 2013/0232267 | A1* | 9/2013 | Shatzkamer et al. ......... 709/226 |

* cited by examiner

*Primary Examiner* — Edan Orgad
*Assistant Examiner* — Sithu Ko

(57) ABSTRACT

A method and apparatus for providing a cloud-based mobility in a wireless network are disclosed. For example, the method receives a path switching request from a user endpoint device. The method then determines if the path switching request is for a regional hand-off. If the path switching request is for a regional hand-off, the method initiates a virtual machine move request for moving a virtual machine providing a mobility support function for a user of the user endpoint device. The method then determines if a response to the virtual machine move request is received. If the response to the virtual machine request is received, the method performs a user plane update and provides a response to the path switching request.

10 Claims, 6 Drawing Sheets

METHOD AND APPARATUS FOR PROVIDING A CLOUD-BASED MOBILITY IN A WIRELESS NETWORK

The present disclosure relates generally to communication networks and, more particularly, to a method and apparatus for providing a cloud-based mobility in a wireless network, e.g., in a long term evolution (LTE) based wireless network.

BACKGROUND

As Internet usage continues to grow, more and more customers are accessing communications services via a mobile device, e.g., a cell phone, a smart phone, a tablet, etc. For example, a customer may receive multimedia content via his/her cell phone. The cell phone transmits and receives voice and data packets to and from the service provider's network via a base station and an access network.

When a customer accesses a service via a wireless network, the customer is provided with the service via one or more network elements, with each network element being dedicated to a functional role. For example, a particular network element may function as a serving gateway. Another particular network element may function as a mobility management entity, etc. These network elements are large scale network elements. As such, the protocols supported by the network elements are complex and costly. When the customer roams to a new location, the functionalities accessed by the customer may not be supported at the new location. As such, the service provider may route each session request back to the home location for processing.

SUMMARY OF THE DISCLOSURE

In one embodiment, the present disclosure teaches a method and apparatus for providing a cloud-based mobility in a wireless network. For example, the method receives a path switching request from a user endpoint device. The method then determines if the path switching request is for a regional hand-off. If the path switching request is for a regional hand-off, the method initiates a virtual machine move request for moving a virtual machine providing a mobility support function for a user of the user endpoint device. The method then determines if a response to the virtual machine move request is received. If the response to the virtual machine request is received, the method performs a user plane update and provides a response to the path switching request.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly teaches a method and apparatus for providing a cloud-based mobility, e.g., in a long term evolution (LTE) based wireless network and the like. Although the teachings of the present disclosure are discussed below in the context of an LTE network, the teaching is not so limited. Namely, the teachings of the present disclosure can be applied for other wireless networks or cellular networks (e.g., 2G network, 3G network and the like), wherein a cloud-based architecture is beneficial.

Broadly defined, 3GPP is a global effort to define a wireless communication system specification. 2G is a second generation cellular network technology, 3G is a third generation cellular network technology, and 4G is a fourth generation cellular network technology. A Global System for Mobile (GSM) communications is an example of a 2G cellular technology and a Universal Mobile Telecommunications System (UMTS) is an example of a 3G cellular network technology. In accordance with the 3GPP global effort, a General Packet Radio Service (GPRS) refers to a communications service used to transfer data via a cellular network. GPRS is available to users of a 2G cellular system GSM. The GPRS provides an enhancement to the GSM system so that data packets are supported. In addition, in 3GPP release 8, an LTE is provided as a set of enhancements to the UMTS. The enhancement focuses on adopting 4th Generation (4G) mobile communications technology to include an all Internet Protocol (IP) end-to-end networking architecture. An LTE is an example of a 4G cellular network technology.

A base station for a 2G network is also referred to as a base transceiver station (BTS). A base station in a 3G network is also referred to as a Node B. For the 4G network, a radio base transceiver station (RBS), as per the 3GPP standards, is referred to as an eNodeB (or simply as a base station). An eNodeB provides an LTE—air interface and performs radio resource management for wireless access.

In one embodiment, a Serving GPRS Support Node (SGSN) refers to a network node responsible for communicating with user endpoint devices and routing of data calls. For example, the SGSN may send and receive data packets to and from user endpoint devices in the coverage area of the SGSN.

In one embodiment, a Gateway GPRS Support Node (GGSN) refers to a network node responsible for the interworking between the GPRS network and external packet switched networks, e.g., the Internet. The GGSN converts the GPRS packets coming from the SGSN into the packet data protocol (PDP) format of the external packet network. For example, the GPRS packet may be converted to an Internet Protocol packet prior to being sent to the external network, which is Internet Protocol based.

Figure 1:
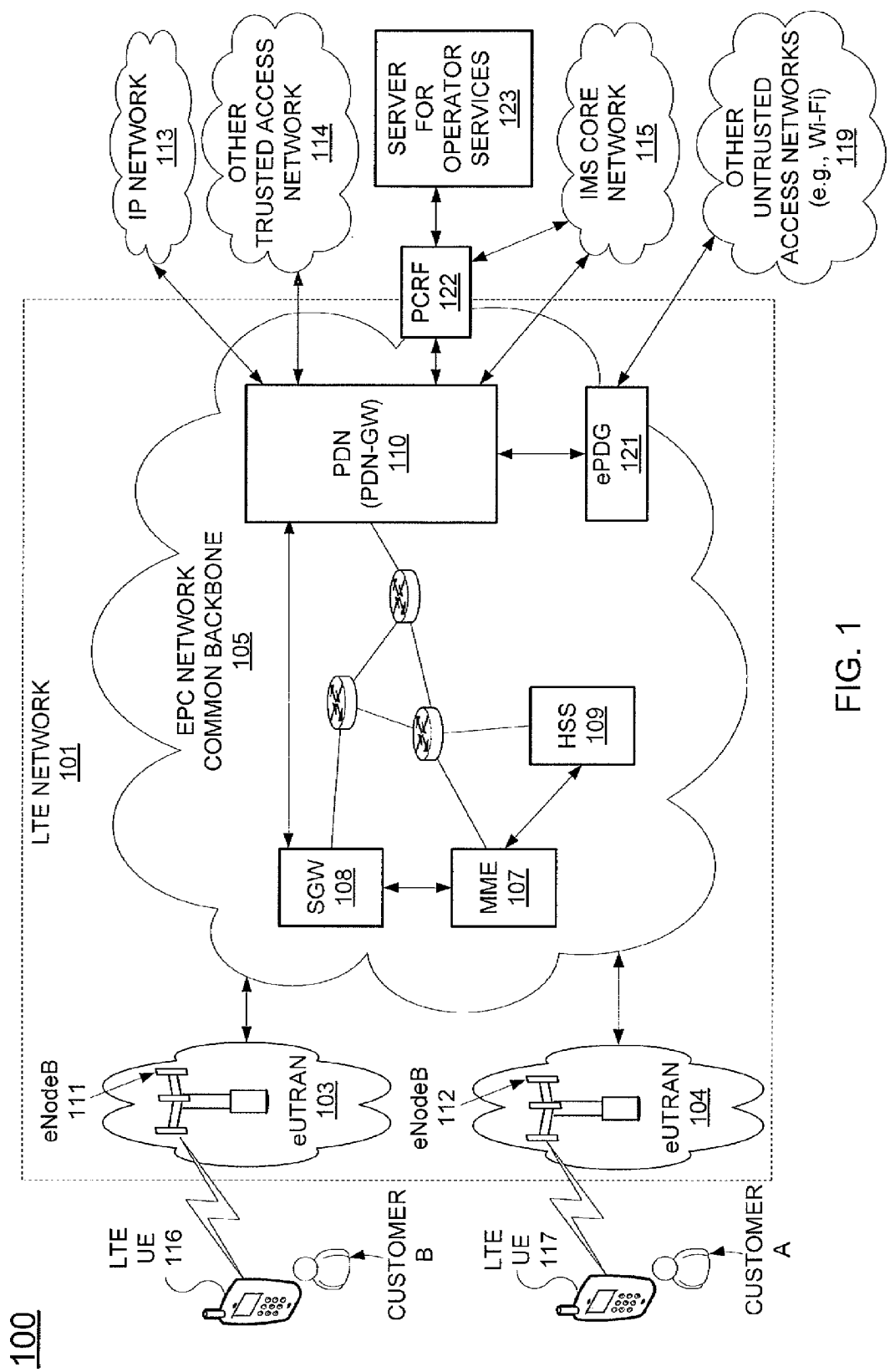
FIG. 1 is a block diagram depicting an illustrative network related to the current disclosure.

FIG. 1 illustrates an exemplary network 100 related to the present disclosure. In one illustrative embodiment, the network 100 comprises an LTE network 101, an IP network 113, other trusted access network 114, a core network, e.g., an IMS core network 115, and other un-trusted access networks 119, e.g., Wi-Fi networks and the like.

FIG. 1 also illustrates various user endpoint devices, e.g., LTE user endpoint devices 116 and 117. The user endpoint devices 116 and 117 can be a smart phone, a cellular phone, a computer or laptop, a tablet, or any endpoint communication devices equipped with wireless capabilities.

In one illustrative embodiment, the LTE network 101 comprises access networks 103 and 104 and a core network 105. In one example, each of the access networks 103 and 104 comprises an evolved Universal Terrestrial Radio Access Network (eUTRAN). In one example, the core network 105 comprises an Evolved Packet Core (EPC) network.

The eUTRANs are the air interfaces of the 3GPP's LTE specifications for mobile networks. Namely, the eUTRAN comprises a radio access network standard that will replace previous generations of air interface standards. All eNodeBs in the eUTRANs 103 and 104 are in communication with the EPC network 105. In operation, LTE user equipment or user endpoints (UE) 116 may access wireless services via the eNodeB 111 located in the eUTRAN 103. Similarly, the LTE UE 117 may access wireless services via the eNodeB 112 located in the eUTRAN 104.

It should be noted that any number of eNodeBs can be deployed in an eUTRAN. In one illustrative example, the eUTRANs 103 and 104 may comprise one or more eNodeBs.

An EPC network provides various functions that support wireless services in the LTE environment. In one embodiment, an EPC network is an Internet Protocol (IP) packet core network that supports both real-time and non-real-time service delivery across a LTE network, e.g., as specified by the 3GPP standards.

In EPC network 105, network devices Mobility Management Entity (MME) 107 and Serving Gateway (SGW) 108 support various functions as part of the LTE network 100. For example, MME 107 is the control node for the LTE access-network. In one embodiment, it is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-eNodeB handovers and as the anchor for mobility between LTE and other wireless technologies, such as 2G and 3G wireless networks.

In addition, EPC (common backbone) network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a public data network gateway 110 which serves as a gateway that provides access between the EPC network 105 and various data networks, e.g., other IP networks 113, an IMS core network 115, other trusted access networks 114, servers 123 that support the Internet Protocol services and applications provided by a network operator, and the like. The public data network gateway is also referred to as a PDN gateway, a PDN GW or a PGW. In one embodiment, the Internet Protocol services and applications provided by a network operator, via server(s) 123, may comprise trans-coding (broadly encompassing data conversion of one encoding to another, e.g., format conversion, file size conversion, encoding rate conversion (trans-rating) and so on), a back-end of a distributed application (e.g., a silk browser), and so on. These Internet Protocol services and applications may be collectively referred to as operator services.

In one embodiment, the EPC network 105 may also comprise a Policy Charging and Rule Function (PCRF) 122 that supports accesses to subscriber databases and specialized functions of a charging system.

In one embodiment, the EPC network 105 may also comprise an evolved Packet Data Gateway (ePDG) 121 that supports interworking between the EPC 105 and other un-trusted non-3GPP networks 119 that need secure access. For example, the ePDG 121 may provide interworking between an un-trusted Wi-Fi network and the EPC 105 by providing a termination of an IP-sec tunnel that is established with a user endpoint device.

Internet Protocol mobility is provided to the user endpoint device using a Mobile Internet Protocol (MIP), a Proxy Mobile Internet Protocol (PMIP), or a Local Identity Separation Protocol (LISP). For example, if MIP is used, routing is facilitated by assigning two addresses to a mobile endpoint device: a home address (HoA) and a care-of-address (CoA). The home address is the Internet Protocol address assigned to the user endpoint device within the endpoint device's home network. A care-of-address of a mobile endpoint device is an Internet Protocol address of the user endpoint device when the device is operating in a foreign network. A foreign network is any network to which the user endpoint device attaches, while being away from the home network. The home network comprises a home agent and the foreign network comprises a foreign agent. For example, the home agent and the foreign agent are routers that tunnel traffic to and from the mobile endpoint device via a CoA tunnel that is established between them. The mobile Internet Protocol maintains a mapping of the HoA and the CoA of the user endpoint device. When a mobile endpoint device attaches to a new eNodeB, the CoA of the mobile endpoint device may change while the home address remains the same.

It should be noted that although various networks are shown as separate networks in FIG. 1, it is possible that functions performed by these networks can be combined into fewer networks or expanded into a greater number of networks depending on the deployment requirements.

It should also be noted that the above illustrated network 100 is only illustrative and the number of network components or elements are not specifically limited as shown. Any number of network components or elements can be deployed.

A network service provider may provide services to customers via a plurality of network elements, with each network element dedicated to a specific functionality of a protocol, e.g., the 3GPP protocol. Although, a particular network element may be used for a variety of functions, in a large network, a network element may become highly customized for a specific functionality. For example, a particular network element may function as a serving gateway, as a mobility management entity, and so on. As more and more customers rely on a specific functionality of a network element, more and more resources of the network element are dedicated to the specific functionality. For example, a serving gateway may be managing numerous GTP tunnels for a large number of customers. The management of the numerous tunnels may consume a large amount of the serving gateway's resources.

In one embodiment, the method of the present disclosure provides a cloud-based environment for a wireless network. The cloud-based environment comprises a plurality of servers, e.g., a plurality of commercial off the shelf (COTS) servers supporting a plurality of regions. Coverage within a region may be provided via any number of eNodeBs deployed within the region. Each server of the plurality of servers is able to support a plurality of virtual machines for a specific region of the plurality of regions. Each server of the plurality of servers also has an associated agent. The agent associated with a particular server serves as a home agent to user endpoint devices that attach to an eNodeB within the region served by the particular server. The agent associated with the particular server also serves as a foreign agent to user endpoint devices that attach to an eNodeB located external to the region served by the particular server.

The service provider may then provide each customer with a mobility support function and/or an application support function using a particular virtual machine. For example, each user endpoint device is assigned a virtual machine that supports the customer's shard of an Evolved Packet Core (EPC) network. The virtual machine is then a shard of the EPC network that is instantiated in a physical server, wherein the physical server is serving a region in which the user endpoint device is located. Each function of the EPC network for a particular customer accessed via the user endpoint device is instantiated within the virtual machine that support's the particular user endpoint device, in a single-customer format. For example, one or more of the mobility support functions of: a serving gateway (SGW), a mobility management entity (MME), a packet data network gateway (PDN gateway, PDN GW, or PGW), a Policy Charging and Rule Function (PCRF), an evolved packet data gateway (ePDG), and one or more operator services (Op Svc) for the particular customer may be instantiated in the particular virtual machine that supports services for the particular customer.

In one embodiment, the service provider implements the method for providing mobility of the present method via the MME and a virtual machine manager. The MME is responsible for initiating virtual machine move request messages (broadly virtual machine move requests) and user plane update request messages (broadly user plane update requests). In one embodiment, the virtual machine manager is a server, e.g., an application server, responsible for moving the virtual machine and performing an update of a home agent, as described below.

Movement of the user endpoint device within a region may be supported via a local hand-off. A local hand-off involves a change from a coverage area of a first eNodeB to a coverage area of a second eNodeB, within the same region. When a local hand-off occurs, the COTS server that supports the region remains the same. For example, if the user endpoint device moves to a coverage area of another eNodeB, a local hand-off and a user plane update are performed to enable the user endpoint device to communicate via the eNodeB closest to the user endpoint device.

Movement of the user endpoint device between regions may be supported via a regional hand-off that involves a change to the COTS server. For example, the virtual machine is instantiated in a particular physical server serving the particular region wherein the user endpoint device is located. If the user endpoint device then moves to another region served by a second physical server, the method moves the virtual machine from the first server to the second server. In one embodiment, the present method also updates a home agent record of the user endpoint device to reflect a current location of the virtual machine serving the particular user endpoint device. For example, the home agent is updated such that the agent associated with the second server is designated as the home agent. The updating of the home agent enables routing traffic to and from the user endpoint device via a data center of the second server.

For both the local and regional hand-offs, if a user endpoint device moves from a coverage area of a first eNodeB to a coverage area of a second eNodeB, the MME receives a path switching request from the user endpoint device. Upon receiving a path switching request from the user endpoint device, the MME first determines if the path switching request is for a local hand-off or a regional hand-off. If the path switching request is for a local hand-off, the virtual machine remains in the same physical server. As such, the method performs the user plane update using a normal process for a local hand-off. "Normal" process in the present disclosure refers to any known process that is used to perform an update operation.

If the path switching request is for a regional hand-off, the MME initiates a virtual machine move request. The virtual machine move request is sent to a virtual machine manager. The virtual machine manager moves the virtual machine and updates the home agent of the user endpoint device in accordance with the virtual machine move request. The virtual machine manager then notifies the MME. For example, the virtual machine manager may send to the MME a virtual machine move acknowledgement message, as a reply to the previously received virtual machine move request. The virtual machine move acknowledgement message may also be referred to as simply as a virtual machine move acknowledgement. If the MME receives a virtual machine move acknowledgment, the MME initiates a user plane update request. The user plane update is performed such that data to and from the user endpoint device is directed towards the server wherein the virtual machine is located.

It should be noted that the term "path switching request" is used to refer to a number of events that might be used to trigger the movement of the virtual machine from one physical entity to another. Beyond the handoff scenario already described, a path switching request is also intended to include the following scenarios.

1) The device is deactivated in one region and then reactivated in another. This is exemplified when a device is put into airplane mode, and then travels to another location. After the device radio is re-energized it re-establishes connectivity without a handover per-se. Nevertheless, this situation may well trigger a move of the virtual machine that supports the device.
2) The device performs a hand-off among access types that have differing access architectures. The example here is a device that moves from a trusted access to an untrusted access. In the former case the access may be connected directly to a set of servers that support the virtual machines, and in the latter case the access may traverse a security gateway before it can access those servers. When a device moves attachment from one type to the other type of access, then that may be a trigger to move the virtual machine to an alternate physical machine that is better optimized to support the service.
3) The device manipulates multiple access connections in concert—as would be the case in LTE-A carrier aggregation or the simultaneous use of 3G and WiFi access; and the manipulations of adding or retiring access components that comprise the larger access set trigger the change of physical hosts for the virtual machine.
4) The device has become idle or switched off. In this case the VM supporting the device might be moved to a host that is engineered to support idle VMs, or it may cease execution and become a VM image stored until the device is activated once again.

A user endpoint device may also be moved to a location outside the coverage area of the service provider. For example, the user endpoint device may be in a coverage area of another service provider and may wish to access services via a roaming feature. The user endpoint device may then send an attachment request to the MME via the serving gateway. The MME then sends a virtual machine move request to a virtual machine manager. The virtual machine manager may then move the virtual machine to a data center closer to the user endpoint device. The virtual machine manager then notifies the MME. For example, the virtual machine manager may send to the MME a virtual machine move acknowledgement. If the MME receives a virtual machine move acknowledgment, the MME initiates a process for creating a default bearer. For example, the MME may send a create-a-default-bearer message to the serving gateway. The serving gateway may then create a default bearer for the user endpoint device. The serving gateway may then send a request to a packet data network gateway (PGW) to create a default bearer between the serving gateway and the PGW. The PGW then creates the default bearer and allocates an Internet Protocol address for the user endpoint device. The PGW provides a response to the serving gateway. Once the serving gateway receives the response indicating that the default bearer is created, the serving gateway replies to the MME's create-a-default-bearer message. The MME may then establish a bearer between the eNodeB and the serving gateway using a normal process. A user plane update is performed such that data to and from the user endpoint device is directed towards the data center wherein the virtual machine is located.

Figure 2:
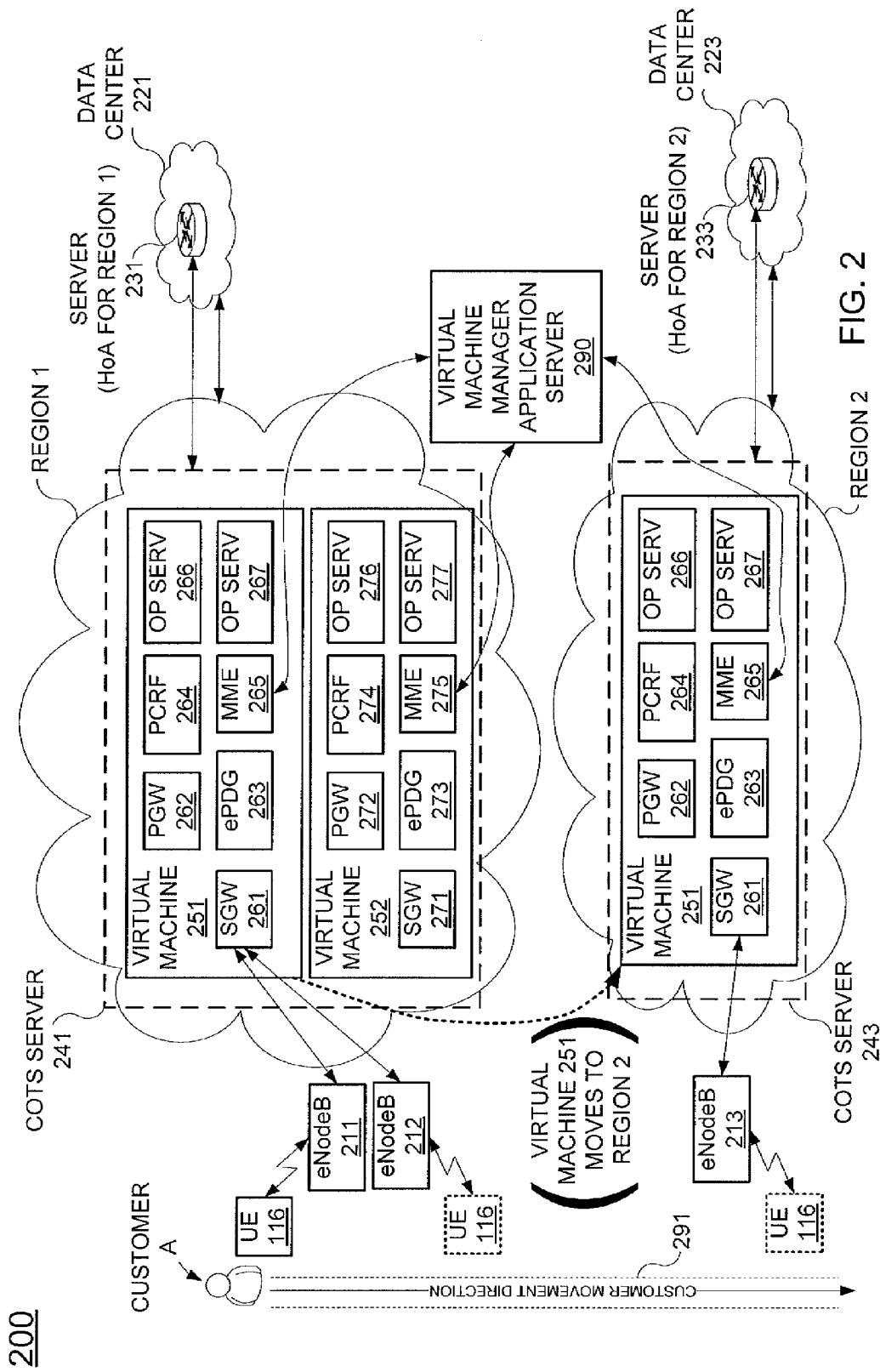
FIG. 2 illustrates an exemplary network for providing a cloud-based mobility in a wireless network.

FIG. 2 illustrates an exemplary network 200 for providing a cloud-based mobility in a wireless network. The network 200 comprises regions 1 and 2. Coverage within region 1 may be provided via eNodeBs 211 and 212. Coverage within region 2 may be provided via eNodeB 213. The service provider provides each customer with a mobility support and an application support using a particular virtual machine. For each customer, a virtual machine may be instantiated in a commercial off the shelf (COTS) server. For example, COTS server 241 may be used for customers attaching to region 1 and COTS server 243 may be used for customers attaching to region 2. A server 231 located in a data center 221 serves as a home agent to the COTS server 241 located in region 1. Similarly, a server 233 located in a data center 223 serves as a home agent to the COTS server 243 located in region 2.

An exemplary customer A moves with a user endpoint device 116 in a customer movement direction 291. For example, customer A may be assigned a virtual machine 251. The virtual machine 251 supports customer A's shard of an Evolved Packet Core (EPC) network. Each function of an EPC network for customer A is instantiated within the virtual machine 251. For example, for customer A, a serving gateway 261, a packet data network gateway 262, an evolved packet data gateway 263, a Policy Charging and Rule Function 264, a mobility management entity 265, and operator services 266 and 267 are instantiated in the virtual machine 251. Similarly, for another customer, a serving gateway 271, a packet data network gateway 272, an evolved packet data gateway 273, a Policy Charging and Rule Function 274, a mobility management entity 275, and operator services 276 and 277 are instantiated in the virtual machine 252 and so on.

In one embodiment, the service provider implements the present method for providing mobility via an MME and a virtual machine manager. The MME is responsible for initiating virtual machine move requests and user plane update requests. For example, the virtual machine manager (e.g., an application server) 290 may be responsible for moving the virtual machines and performing updates of home agents.

As the customer A moves along the customer movement direction 291, the customer may move from a coverage area of eNodeB 211 to a coverage area of eNodeB 212. If the customer moves to the coverage area of eNodeB 212, the MME 265 receives a path switching request from the user endpoint device 116, via the eNodeB 212. Upon receiving a path switching request from the user endpoint device 116, the MME 265 determines that the path switching request is for a "local hand-off." Since the path switching request is for a local hand-off, the virtual machine 251 remains in the same COTS server 241. The MME then performs a user plane update using a normal process for a local hand-off.

If the customer A continues to move along the customer movement direction 291, the customer may move from the coverage area of eNodeB 212 to a coverage area of eNodeB 213. If the customer moves to the coverage area of eNodeB 213, the customer is no longer in region 1. The MME 265 receives a path switching request from the user endpoint device 116, via the eNodeB 213 which is serving user endpoint devices in region 2. Upon receiving the path switching request from the user endpoint device 116, the MME 265 determines that the path switching request is for a "regional hand-off." Since the path switching request is for a regional hand-off, the MME 265 initiates a virtual machine move request. The MME 265 sends the virtual machine move request to the virtual machine manager 290. The virtual machine manager 290 moves the virtual machine 251 to the COTS server 243 located in region 2. The virtual machine manager 290 then updates the home agent of the user endpoint device 116 to indicate the current location of the virtual machine. The updated home agent of the user endpoint device is server 233 located in the data center 223. The virtual machine manager 290 then notifies the MME 265. For example, the virtual machine manager 290 may send to the MME 265 a virtual machine move acknowledgement, as a response to the virtual machine move request. The MME 265 then receives the virtual machine move acknowledgment and initiates a user plane update request. The user plane update is performed such that data to and from the user endpoint device 116 is directed towards the COTS server 243. Subsequent data to and from the user endpoint device 116 may then be routed via the data center 223 to the COTS server 243.

If the customer A moves to a location outside the coverage area of the service provider, the MME 265 may receive an attachment request from the user endpoint device via the serving gateway. The MME then sends a virtual machine move request to the virtual machine manager 290. The virtual machine manager may then move the virtual machine to a data center closer to the new location of the user endpoint device. The virtual machine manager then notifies the MME 265. For example, the virtual machine manager 290 may send to the MME 265 a virtual machine move acknowledgement. When the MME 265 receives the virtual machine move acknowledgment, the MME sends a create-a-default-bearer message to the serving gateway. The serving gateway may then create a default bearer for the user endpoint device 116. The serving gateway may then send a request to the packet data network gateway (PGW) to create a default bearer between the serving gateway and the PGW. The PGW then creates the default bearer and allocates an Internet Protocol address for the user endpoint device. The PGW provides a response to the serving gateway. Once the serving gateway receives the response indicating that the default bearer is created, the serving gateway replies to the MME's create-a-default-bearer message. The MME 265 may then establish a bearer between the eNodeB and the serving gateway (at the new location) using a normal process. A user plane update is performed such that data to and from the user endpoint device is directed towards the data center wherein the virtual machine is located.

Figure 3:
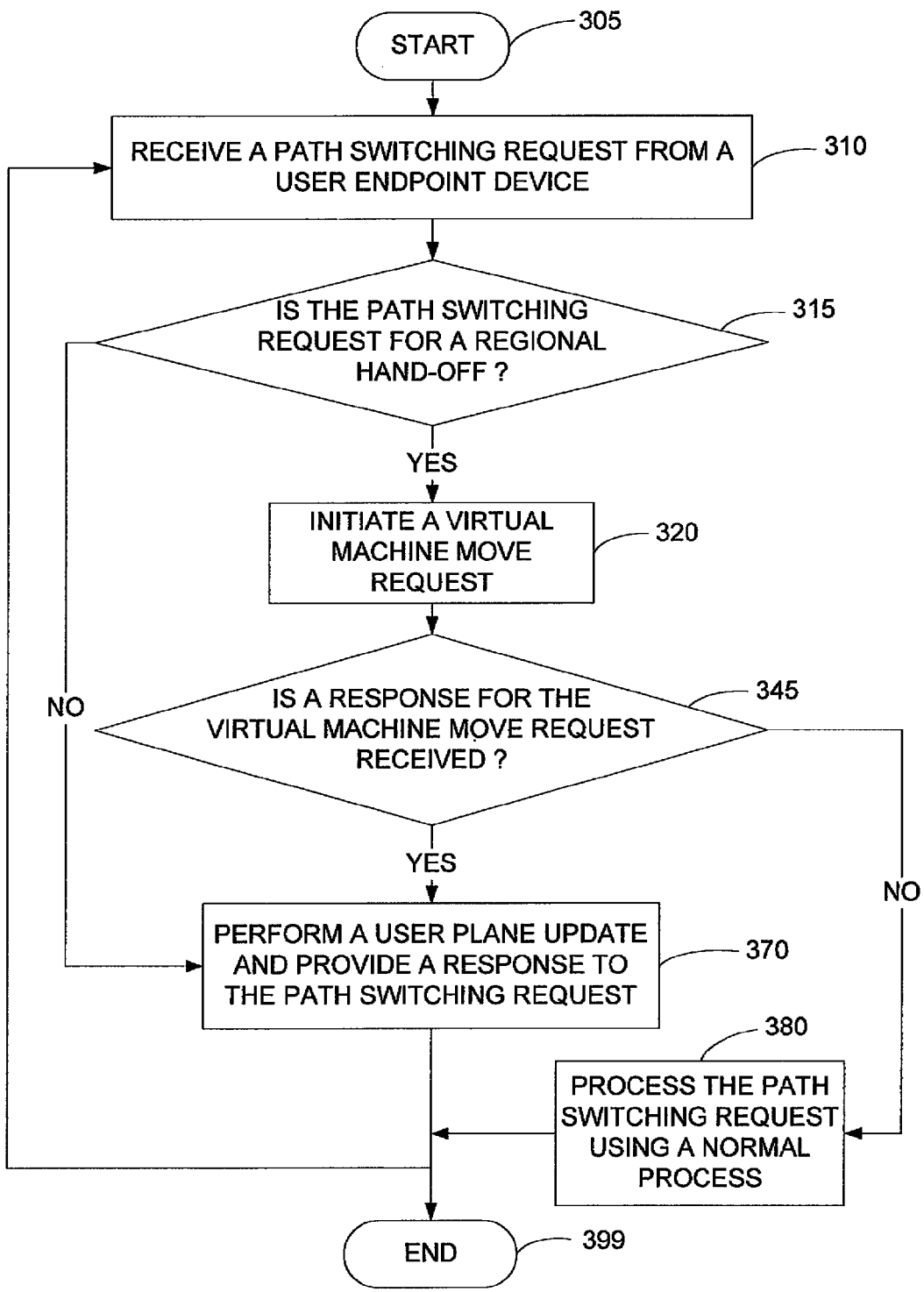
FIG. 3 illustrates a flowchart of a method for providing a cloud-based mobility in a wireless network.

FIG. 3 illustrates a flowchart of a method 300 for providing a cloud-based mobility in a wireless network. For example, the method may be implemented in a Mobility Management Entity (MME) as shown in FIG. 2 or the general purpose computer illustrated in FIG. 6 below. Method 300 starts in step 305 and proceeds to step 310.

In step 310, method 300 receives a path switching request from a user endpoint device. For example, the MME may receive a path switching request for either a local hand-off or a regional hand-off.

In step 315, method 300 determines if the path switching request is for a regional hand-off. If the path switching request is for a regional hand-off, the method proceeds to step 320. Otherwise, the method proceeds to step 370.

In step 320, method 300 initiates a virtual machine move request. For example, the MME may send the virtual machine move request to a virtual machine manager.

In step 345, method 300 determines if a response to the virtual machine move request is received. For example, the MME may receive from a virtual machine manager, a virtual machine move acknowledgment. If the response to the virtual machine move request is received, the method proceeds to step 370. If no response is received or the virtual machine move request is not granted, the method proceeds to step 380.

In step 370, method 300 performs a user plane update and provides a response to the path switching request, if a response to the virtual machine move request is received. The user plane update and the providing of the response to the path switching request are performed using a normal process. In one example, the path switching request is for a local hand-off. The method then performs the user plane update in accordance with the local hand-off. In another example, the path switching request is for a regional hand-off. The method then performs the user plane update in accordance with the regional hand-off. The user plane update enables routing traffic to and from the user endpoint device via a data center associated with the server, wherein the virtual machine is currently located in the server. The method then proceeds to either step 399 to end processing the current path switching request or returns to step 310 to receive another path switching request.

In step 380, method 300 processes the path switching request using a normal process. The method then proceeds to either step 399 to end processing the current path switching request or returns to step 310 to receive another path switching request.

Figure 4:
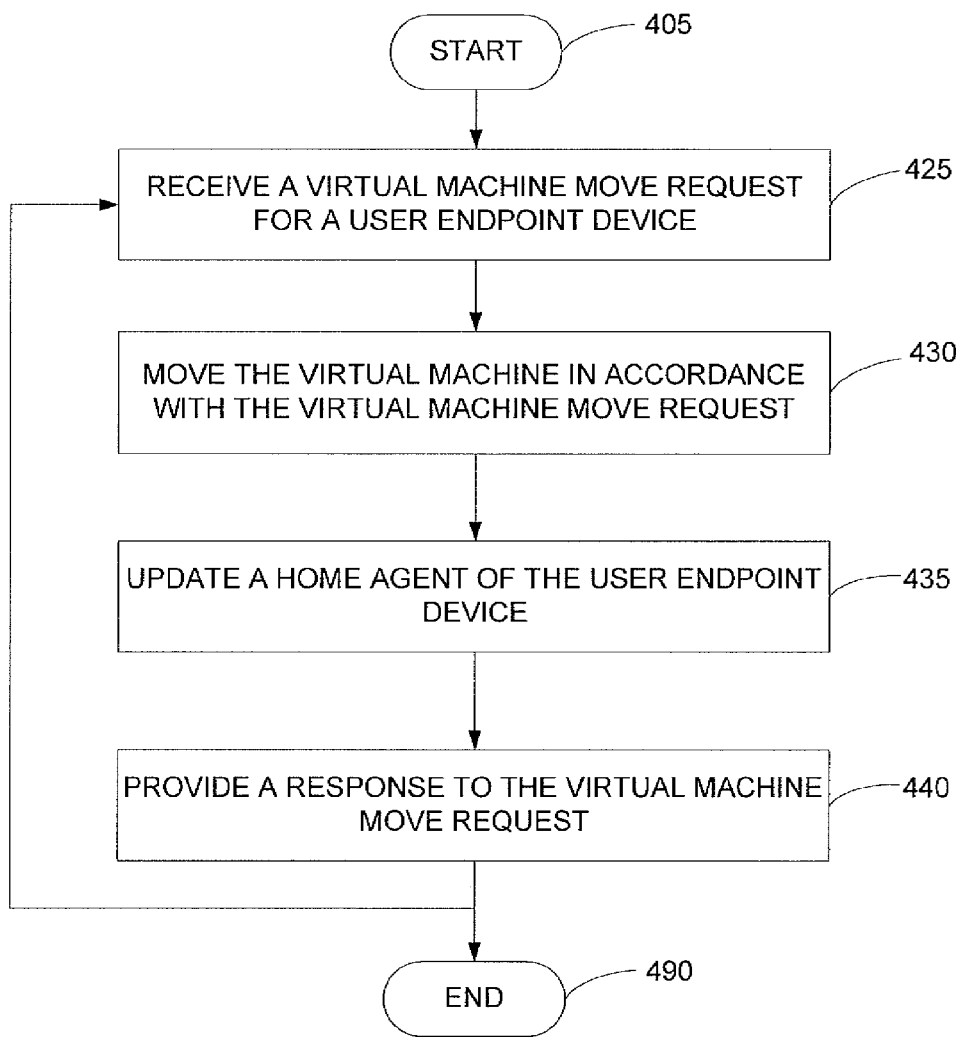
FIG. 4 illustrates a flowchart of a method for a virtual machine manager supporting a cloud-based mobility in a wireless network

FIG. 4 illustrates a flowchart of a method 400 for a virtual machine manager supporting a cloud-based mobility in a wireless network. For example, the method may be implemented in an application server as shown in FIG. 2 or the general purpose computer illustrated in FIG. 6 below. Method 400 starts in step 405 and proceeds to step 425.

In step 425, method 400 receives a virtual machine move request for a user endpoint device. For example, a virtual machine manager receives a virtual machine move request from an MME.

In step 430, method 400 moves the virtual machine in accordance with the virtual machine move request. For example, the virtual machine manager moves the instantiation of the virtual machine in accordance with a regional hand-off. For example, the virtual machine may move the virtual machine to another physical server serving a region in which the user endpoint device is now located.

In step 435, method 400 updates a home agent of the user endpoint device by assigning a server located in a data center associated with the current location of the virtual machine as the home agent.

In step 440, method 400 provides a response to the virtual machine move request. For example, the virtual machine manager may send to the MME a virtual machine move acknowledgement, as a response to the virtual machine move request. The virtual machine move acknowledgement indicates that the request is granted and the virtual machine is moved in accordance with the request. In one embodiment, if the request cannot be granted, the virtual machine manager may provide a reply indicating that the virtual machine move request is not granted. The method then proceeds to either step 490 to end processing the current virtual machine move request or returns to step 425 to receive another virtual machine move request.

Figure 5:
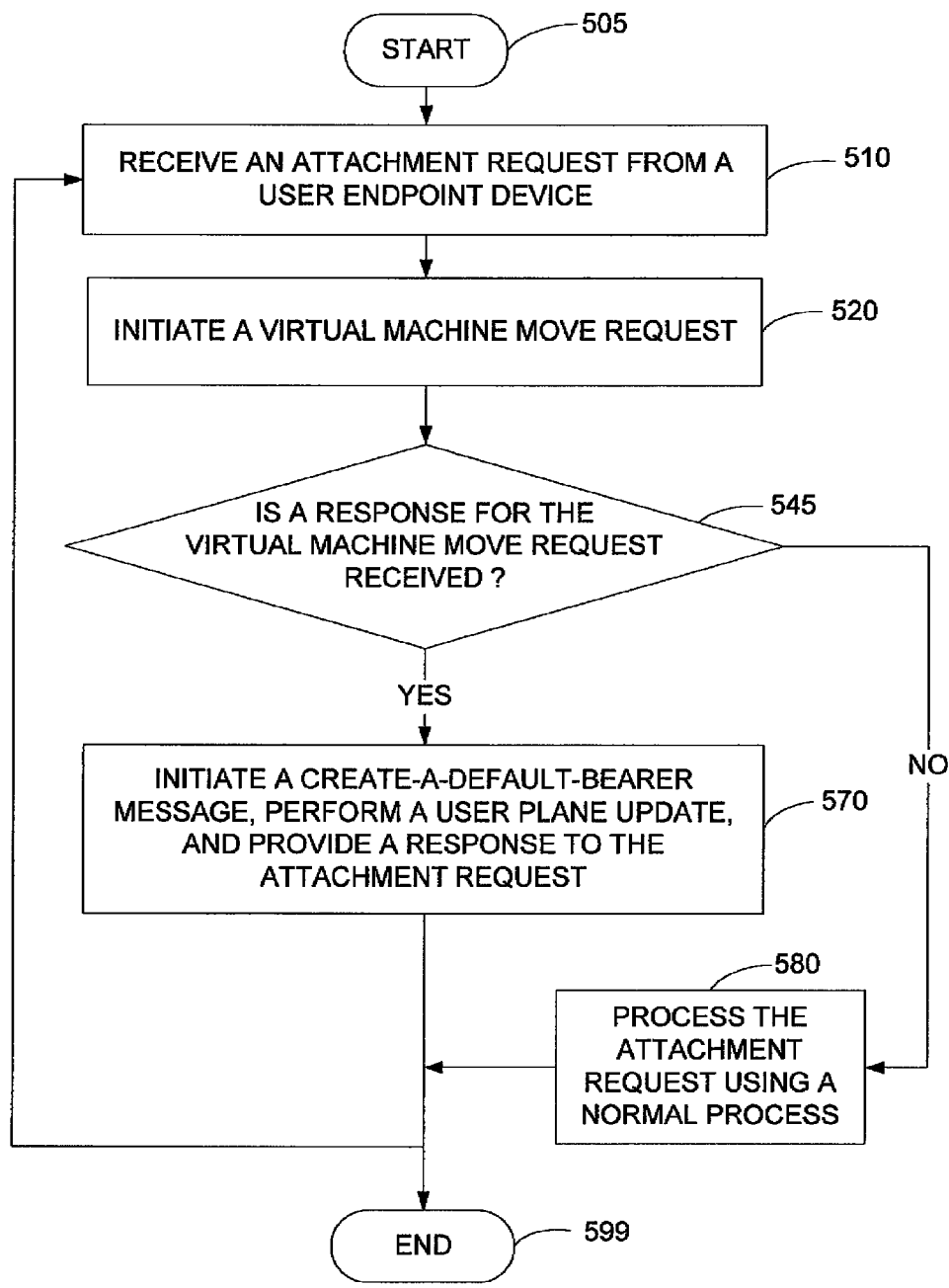
FIG. 5 illustrates a flowchart of a method for providing a cloud-based mobility for a roaming hand-off in a wireless network.

FIG. 5 illustrates a flowchart of a method 500 for providing a cloud-based mobility for a roaming hand-off in a wireless network. For example, the method may be implemented in a Mobility Management Entity (MME) as shown in FIG. 2 or the general purpose computer illustrated in FIG. 6 below. Method 500 starts in step 505 and proceeds to step 510.

In step 510, method 500 receives an attachment request from a user endpoint device, wherein the user endpoint device is located outside a serving area of a service provider. For example, the MME may receive an attachment request when the user endpoint device is in another service provider's coverage area. For example, the user endpoint device may be attempting to attach to another service provider network via a roaming feature.

In step 520, method 500 initiates a virtual machine move request. For example, the MME may send the virtual machine move request to a virtual machine manager. The virtual machine manager may then move the virtual machine to a data center closer to the new location of the user endpoint device.

In step 545, method 500 determines if a response to the virtual machine move request is received. For example, the MME may receive from a virtual machine manager, a virtual machine move acknowledgment. If the response to the virtual machine move request is received, the method proceeds to step 570. If no response is received or the virtual machine move request is not granted, the method proceeds to step 580.

In step 570, if the response to the virtual machine move request is received, method 500 proceeds to a normal process to initiate a create-a-default-bearer message, perform a user plane update, and provide a response to the attachment request. For example, the MME may send the create-a-default-bearer message to the serving gateway. The serving gateway may then create a default bearer for the user endpoint device. The serving gateway may then send a request to the packet data network gateway (PGW) to create a default bearer between the serving gateway and the PGW. The PGW may then create the default bearer and allocate an Internet Protocol address for the user endpoint device. The PGW provides a response to the serving gateway. Once the serving gateway receives the response indicating that the default bearer is created, the serving gateway replies to the MME's create-a-default-bearer message. The MME may then establish a bearer between the eNodeB and the serving gateway (at the new location) using a normal process. The user plane update is performed such that data to and from the user endpoint device is directed towards the data center wherein the virtual machine is located. The method then proceeds to either step 599 to end processing the current attachment request or returns to step 510 to receive another attachment request.

In step 580, method 500 processes the attachment request using a normal process. The method then proceeds to either step 599 to end processing the current attachment request or returns to step 510 to receive another attachment request.

It should be noted that although not specifically specified, one or more steps or operations of each of the respective methods 300 and 400 may include a storing, displaying and/or outputting step as required for a particular application. In other words, any data, records, fields, and/or intermediate results discussed in each of the respective methods can be stored, displayed and/or outputted to another device as required for a particular application. Furthermore, steps, blocks, or operations in each of FIGS. 3-5 that recite a determining operation or involve a decision do not necessarily require that both branches of the determining operation be practiced. In other words, one of the branches of the determining operation can be deemed as an optional step.

Figure 6:
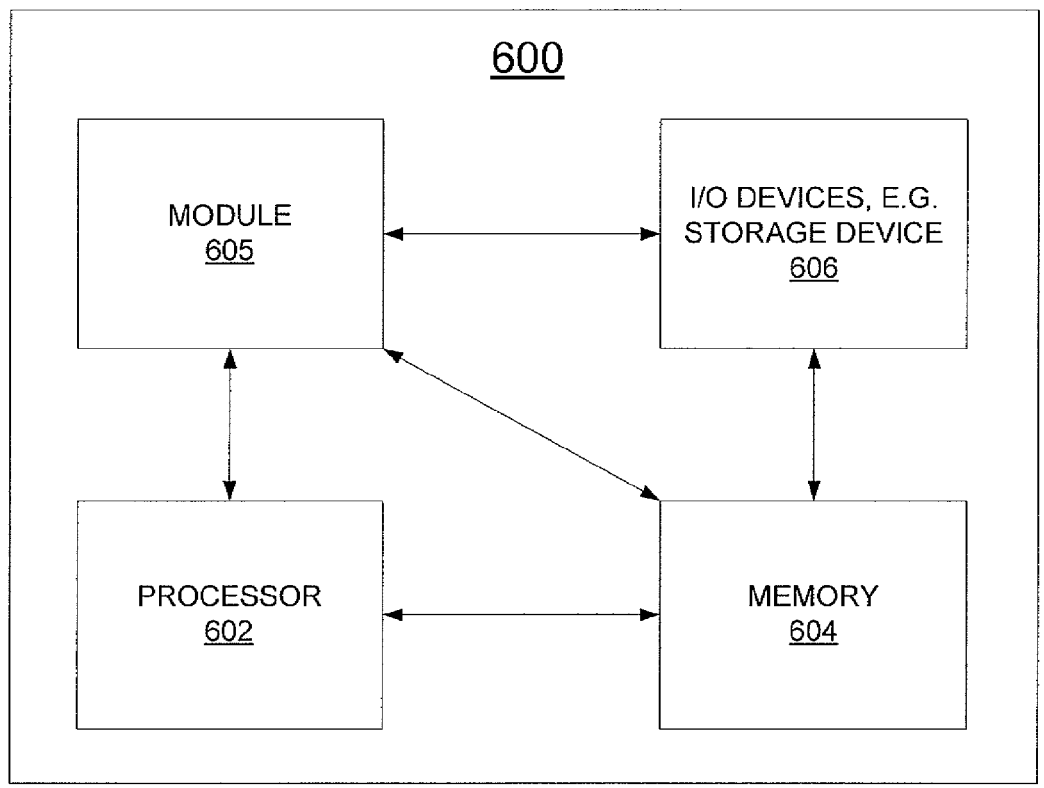
FIG. 6 depicts a high-level block diagram of a general-purpose computer suitable for use in performing the functions described herein.

FIG. 6 depicts a high-level block diagram of a general-purpose computer suitable for use in performing the functions described herein. As depicted in FIG. 6, the system 600 comprises a hardware processor element 602 (e.g., a CPU), a memory 604, e.g., random access memory (RAM) and/or read only memory (ROM), a module 605 for providing a cloud-based mobility in a wireless network, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)). Moreover, it should be noted that the virtual machines described in this disclosure are similarly comprised of virtualized components as shown in FIG. 6 as are typically created through the use of virtual machine software, or a hypervisor application.

It should be noted that the teachings of the present disclosure can be implemented in software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. For example, a computer-readable medium may be in communication with the processor, where the computer-readable medium having stored thereon a plurality of instructions, the plurality of instructions including instructions which, when executed by the hardware processor, cause the hardware processor to perform the methods (e.g., methods 300-500) as disclosed above.

In one embodiment, the present module or process 605 for sharing a service can be loaded into memory 604 and executed by processor 602 to implement the functions as discussed above. As such, the present method 605 for providing a cloud-based mobility in a wireless network (including associated data structures) of the present disclosure can be stored on a non-transitory (e.g., tangible or physical) computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a path switching request in a wireless network, comprising:
receiving, by a processor of a mobility management entity of a virtual machine on a first server, the path switching request from a user endpoint device;
determining, by the processor, when the path switching request is for a regional hand-off between the virtual machine to another virtual machine;
initiating, by the processor, a virtual machine move request for moving the virtual machine providing a mobility support function for a user of the user endpoint device, when the path switching request is for the regional hand-off, wherein the virtual machine and the another virtual machine each comprises a server with an instantiation of a serving gateway function, a mobility management entity function, a packet data network gateway function, a policy charging and rule function, an evolved packet data gateway function and an operator services function of an evolved packet core network for the user endpoint device, wherein the initiating the virtual machine move request comprises sending the virtual machine move request to a virtual machine manager that is a different server than the virtual machine and the another virtual machine and performs the moving from the virtual machine to the another virtual machine, updates a home agent of the user endpoint device, and sends a virtual machine move acknowledgement;
determining, by the processor, when the virtual machine move acknowledgement is received; and
performing, by the processor, a user plane update and providing a response to the path switching request, when the response to the virtual machine move request is received.

2. The method of claim 1, wherein the virtual machine is a shard of the wireless network that is instantiated in the server, wherein the server is serving a region in which the user endpoint device is located.

3. The method of claim 1, wherein the virtual machine move request indicates a current location of the user endpoint device.

4. The method of claim 1, wherein the moving the virtual machine comprises moving the virtual machine to the server of the another virtual machine providing a service to a region in which the user endpoint device is currently located.

5. The method of claim 1, wherein the performing the update of the home agent comprises assigning as the home agent the server located in a data center associated with a current location of the virtual machine.

6. The method of claim 1, wherein the operator services function comprises a trans-coding function.

7. A non-transitory computer-readable medium storing a plurality of instructions, which when executed by a processor of a virtual machine, cause the processor to perform operations for processing a path switching request in a wireless network, the operations comprising:
receiving the path switching request from a user endpoint device;
determining when the path switching request is for a regional hand-off between the virtual machine to another virtual machine;
initiating a virtual machine move request for moving the virtual machine providing a mobility support function for a user of the user endpoint device, when the path switching request is for the regional hand-off, wherein the virtual machine and the another virtual machine each comprises a server with an instantiation of a serving gateway function, a mobility management entity function, a packet data network gateway function, a policy charging and rule function, an evolved packet data gateway function and an operator services function of an evolved packet core network for the user endpoint device, wherein the initiating the virtual machine move request comprises sending the virtual machine move request to a virtual machine manager that is a different server than the virtual machine and the another virtual machine and performs the moving from the virtual machine to the another virtual machine, updates a home agent of the user endpoint device, and sends a virtual machine move acknowledgement;

determining when the virtual machine move acknowledgement is received; and performing a user plane update and providing a response to the path switching request, when the response to the virtual machine move request is received.

8. The non-transitory computer-readable medium of claim 7, wherein the virtual machine is a shard of the wireless network that is instantiated in the server, wherein the server is serving a region in which the user endpoint device is located.

9. The non-transitory computer-readable medium of claim 7, wherein the virtual machine move request indicates a current location of the user endpoint device.

10. An apparatus for processing a path switching request in a wireless network, comprising:

a processor of a virtual machine; and a computer-readable medium storing a plurality of instructions, which when executed by the processor, cause the processor to perform operations, the operations comprising:

receiving the path switching request from a user endpoint device;

determining when the path switching request is for a regional hand-off between the virtual machine to another virtual machine;

initiating a virtual machine move request for moving the virtual machine providing a mobility support function for a user of the user endpoint device, when the path switching request is for the regional hand-off, wherein the virtual machine and the another virtual machine each comprises a server with an instantiation of a serving gateway function, a mobility management entity function, a packet data network gateway function, a policy charging and rule function, an evolved packet data gateway function and an operator services function of an evolved packet core network for the user endpoint device, wherein the initiating the virtual machine move request comprises sending the virtual machine move request to a virtual machine manager that is a different server than the virtual machine and the another virtual machine and performs the moving from the virtual machine to the another virtual machine, updates a home agent of the user endpoint device, and sends a virtual machine move acknowledgement;

determining when the virtual machine move acknowledgement is received; and performing a user plane update and providing a response to the path switching request, when the response to the virtual machine move request is received.

* * * * *